United States Patent
Aiga et al.

(10) Patent No.: US 10,760,616 B2
(45) Date of Patent: Sep. 1, 2020

(54) SOLID LUBRICANT AND SOLID-LUBRICATION ROLLING BEARING

(71) Applicants: Hisanori Aiga, Mie (JP); Hiroki Manabe, Mie (JP); Takahiro Gotou, Aichi (JP); Yoshinori Ito, Aichi (JP); Fuminori Satoji, Aichi (JP)

(72) Inventors: Hisanori Aiga, Mie (JP); Hiroki Manabe, Mie (JP); Takahiro Gotou, Aichi (JP); Yoshinori Ito, Aichi (JP); Fuminori Satoji, Aichi (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 15/022,228

(22) PCT Filed: Sep. 16, 2014

(86) PCT No.: PCT/JP2014/074398
§ 371 (c)(1),
(2) Date: Mar. 16, 2016

(87) PCT Pub. No.: WO2015/041205
PCT Pub. Date: Mar. 26, 2015

(65) Prior Publication Data
US 2016/0238076 A1    Aug. 18, 2016

(30) Foreign Application Priority Data

Sep. 19, 2013 (JP) ................. 2013-193699
Sep. 24, 2013 (JP) ................. 2013-196465
Oct. 8, 2013 (JP) ................. 2013-211008

(51) Int. Cl.
*F16C 33/18* (2006.01)
*F16C 33/20* (2006.01)
(Continued)

(52) U.S. Cl.
CPC ....... *F16C 33/6696* (2013.01); *C10M 103/02* (2013.01); *C10M 103/06* (2013.01);
(Continued)

(58) Field of Classification Search
CPC .................... C10M 125/02; C10M 103/02
(Continued)

(56) References Cited

U.S. PATENT DOCUMENTS

| 4,637,884 A | 1/1987 | Miyazaki et al. |
| 5,118,207 A | 6/1992 | Ikejiri et al. |

(Continued)

FOREIGN PATENT DOCUMENTS

| DE | 1 026 577 | 3/1958 |
| DE | 3115780 | 11/1982 |

(Continued)

OTHER PUBLICATIONS

International Preliminary Report on Patentability dated Mar. 22, 2016 in International Application No. PCT/JP2014/074398.
(Continued)

*Primary Examiner* — Prem C Singh
*Assistant Examiner* — Francis C Campanell
(74) *Attorney, Agent, or Firm* — Wenderoth, Lind & Ponack, L.L.P.

(57) ABSTRACT

A solid lubricant 11 is formed by molding and firing powder that includes amorphous and self-sintering carbon material powder 12, graphite powder 13, and a binder 14. The solid lubricant has high material strength and hardness, and also excellent impact resistance and wear resistance.

16 Claims, 13 Drawing Sheets

(51) Int. Cl.
F16C 33/66 (2006.01)
C10M 103/02 (2006.01)
C10M 103/06 (2006.01)
F16C 33/38 (2006.01)
F16C 33/44 (2006.01)
F16C 33/42 (2006.01)
F16C 33/37 (2006.01)
F16C 33/78 (2006.01)
C10M 125/04 (2006.01)
C10M 125/22 (2006.01)
F16C 33/372 (2006.01)
F16C 19/06 (2006.01)
B29C 55/20 (2006.01)
C10N 20/06 (2006.01)
C10N 30/00 (2006.01)
C10N 30/06 (2006.01)
C10N 50/08 (2006.01)
C10N 70/00 (2006.01)
C10N 10/12 (2006.01)
C10N 40/02 (2006.01)

(52) U.S. Cl.
CPC ........ *C10M 125/04* (2013.01); *C10M 125/22* (2013.01); *F16C 33/372* (2013.01); *F16C 33/3706* (2013.01); *F16C 33/3818* (2013.01); *F16C 33/3831* (2013.01); *F16C 33/422* (2013.01); *F16C 33/44* (2013.01); *F16C 33/785* (2013.01); *B29C 55/20* (2013.01); *C10M 2201/0413* (2013.01); *C10M 2201/05* (2013.01); *C10M 2201/066* (2013.01); *C10N 2010/12* (2013.01); *C10N 2020/06* (2013.01); *C10N 2030/00* (2013.01); *C10N 2030/06* (2013.01); *C10N 2040/02* (2013.01); *C10N 2050/08* (2013.01); *C10N 2070/00* (2013.01); *F16C 19/06* (2013.01); *F16C 2202/04* (2013.01); *F16C 2202/06* (2013.01); *F16C 2202/52* (2013.01); *F16C 2202/54* (2013.01); *F16C 2206/02* (2013.01); *F16C 2300/54* (2013.01); *F16C 2300/62* (2013.01); *F16C 2322/00* (2013.01)

(58) Field of Classification Search
USPC .................................. 508/100, 102
See application file for complete search history.

(56) References Cited

U.S. PATENT DOCUMENTS

| | | | | |
|---|---|---|---|---|
| 2004/0146709 | A1* | 7/2004 | Tomoto | C04B 35/83 428/355 R |
| 2006/0106152 | A1* | 5/2006 | Metzinger | B82Y 30/00 524/495 |
| 2007/0253654 | A1 | 11/2007 | Nagai et al. | |
| 2012/0141052 | A1* | 6/2012 | Drew | F16C 23/045 384/13 |
| 2012/0315482 | A1* | 12/2012 | Muramatsu | H01G 11/34 428/402 |

FOREIGN PATENT DOCUMENTS

| | | |
|---|---|---|
| DE | 40 41 068 | 1/1992 |
| EP | 1 790 867 | 5/2007 |
| JP | 54-24294 | 2/1979 |
| JP | 57-25483 | 5/1982 |
| JP | 62-95332 | 1/1987 |
| JP | 62-65915 | 3/1987 |
| JP | 63-13953 | 3/1988 |
| JP | 6-337016 | 12/1994 |
| JP | 7-247167 | 9/1995 |
| JP | 9-295867 | 11/1997 |
| JP | 11-182545 | 6/1999 |
| JP | 2001-221235 | 8/2001 |
| JP | 2001-317605 | 11/2001 |
| JP | 2002-323141 | 11/2002 |
| JP | 3550689 | 5/2004 |
| JP | 2004-224982 | 8/2004 |
| JP | 2005-57985 | 3/2005 |
| JP | 2010-65828 | 3/2010 |
| JP | 2012-67884 | 4/2012 |
| JP | 2013-23838 | 2/2013 |
| JP | 2013-79715 | 5/2013 |
| JP | 2014-43900 | 3/2014 |
| JP | 6329352 | 5/2018 |
| WO | 99/60281 | 11/1999 |

OTHER PUBLICATIONS

International Search Report dated Dec. 22, 2014 in International Application No. PCT/JP2014/074398.
Notice of Reasons for Refusal dated Oct. 5, 2017 in counterpart Japanese Application No. 2013-196465, with English translation.
Notice of Reasons for Refusal dated Jun. 2, 2017 in corresponding Japanese Application No. 2013-193699, with English translation.
Notice of Reasons for Refusal dated Jun. 6, 2017 in corresponding Japanese Application No. 2013-211008, with English translation.
Extended European Search Report dated May 11, 2017 in corresponding European Application No. 14846171.8.

* cited by examiner

SOLID LUBRICANT AND SOLID-LUBRICATION ROLLING BEARING

TECHNICAL FIELD

The present invention relates to a solid lubricant and a solid-lubrication rolling bearing.

BACKGROUND ART

A solid-lubrication rolling bearing using a solid lubricant is suitable for use at elevated temperatures or in a vacuum, which prevents use of grease or lubricating oil as a lubricant, for example, for use as a tenter clip bearing of a film stretching machine.

The film stretching machine herein is a machine for manufacturing a stretched film used in general packaging materials, liquid crystal panels, or secondary batteries. To improve the strength of the film, as illustrated in FIG. 25, the film stretching machine continuously transfers a film 100 in a longitudinal direction (direction of an arrow X), and stretches the film 100 in its width direction in a region expressed by a broken line while heating the film 100 (potentially, further stretches the film 100 in its longitudinal direction). The tenter clip is a mechanical component in the film stretching machine, which clips both ends of the film, and stably circulates along a caterpillar guide rail as illustrated by an arrow C in this figure to stretch the film in a predetermined direction. The tenter clip bearing is used in a portion that guides travelling of the tenter clip along the rail at elevated temperatures (250° C. or higher, and about 400° C. at maximum). Therefore, it is necessary to use the solid-lubrication rolling bearing.

Patent literature 1 discloses, as the solid lubricant used in the solid-lubrication rolling bearing, a solid lubricant that is a sintered compact including graphite and a binder, the sintered compact having a combination ratio of graphite of 80 to 98 vol %, a bending strength of 4 to 15 MPa, and a specific wear rate of 1.5 to 2.5×10−5 mm$^3$/(N·m).

CITATION LIST

Patent Literature

Patent literature 1: Japanese Unexamined Patent Application Publication No. 2013-79715

SUMMARY OF THE INVENTION

Technical Problems

However, the solid lubricant described in Patent literature 1 includes graphite as a main ingredient, and the binder are not combined with graphite particles after firing, resulting in low material strength and hardness. This disadvantageously leads to lack of impact resistance and wear resistance, and shortened life of the rolling bearing.

Thus, an object of the present invention is to provide a solid lubricant having high material strength and hardness as well as excellent impact resistance and wear resistance, and a solid-lubrication rolling bearing using the solid lubricant.

Solution to Problems

A solid lubricant according to the present invention is formed by molding and firing powder that includes amorphous and self-sintering carbon material powder, graphite powder, and a binder.

The carbon material powder used according to the present invention is different from crystalline graphite due to its amorphous property, and is different from non self-sintering carbon fiber due to its self-sintering property. Examples of the amorphous and self-sintering carbon material powder include pitch powder and coke powder. Such carbon material powder is hardened by firing, and forms a skeleton structure in which adjacent carbon material particles are combined with each other after firing due to the self-sintering property. The graphite particles are held by the skeleton structure and thus, are hard to fall off. This can increase material strength and improve impact resistance and wear resistance.

To attain the above effects, a combination ratio of the carbon material powder is preferably larger than a combination ratio of the graphite powder in weight ratio. In this case, a green compact containing the carbon material powder of 50 to 60 wt % and, graphite powder of 25 to 40 wt % can be used.

Both of the carbon material powder and the graphite powder are small powder, and have a low apparent density and a low fluidity. Thus, they cannot smoothly fill a forming die. To counteract this, preferably, the carbon material powder and the graphite powder are granulated using a binder, and a green compact is molded using the granulated powder.

At elevated temperatures, the lubricity of graphite lowers due to a decrease in moisture to decrease the wear resistance of the solid lubricant. However, the decrease in the wear resistance can be compensated by adding at least one of W, Mo, and MoS$_2$ to the solid lubricant.

The wear resistance can be further improved by adding carbon fiber or carbon nanotube to the solid lubricant.

In the solid lubricant, the bending strength can be set to 40 to 100 MPa, and the Shore hardness (HSC) can be set to 50 to 100. The specific wear rate of the solid lubricant can be set to 1.0 to 2.5×10−7 mm$^3$/(N·m). The density of the solid lubricant can be set to 1.0 to 3.0 g/cm$^3$.

A solid-lubrication rolling bearing according to the present invention includes: an outer ring having an outer raceway face; an inner ring having an inner raceway face; a plurality of rolling elements disposed between the outer raceway face and the inner raceway face; and a separator disposed between the adjacent rolling elements, relative movement of the adjacent rolling elements and the separator in a direction of separating apart in a circumferential direction is restricted by restricting members, and the restricting members are disposed at a plurality of places in the circumferential direction to allow relative movement between the adjacent restricting members.

With such configuration, a moving range of each rolling element in the circumferential direction is restricted by the restricting members. For this reason, even when the separator becomes smaller due to wear caused by the operation of the bearing, all of the rolling elements are prevented from being unevenly distributed in a partial circumferential region. Thus, the outer ring is not separated from the inner ring even after long-term operation, preventing unintended disassembling of the bearing.

Since the restricting members can individually move, the size of a gap between the rolling element and an inner side face of the restricting member can be flexibly changed. For this reason, discharging the solid lubricant powder accumulated in the gap can be promoted, preventing the gap from being filled with the solid lubricant powder to cause rotational locking. Since the restricting members are not connected to each other with a connecting member such as a rivet, there is no need to ensure a set-up space for the connecting member in the bearing in the circumferential direction. Thus, many rolling elements can be assembled in the bearing to increase a basic rated load of the bearing. Moreover, the operation of connecting the restricting members to each other becomes unnecessary, reducing man-hour at assembling of the bearing.

To attain the above effects, preferably, each of the restricting members is provided with a bottom portion extending between the outer ring and the inner ring in the circumferential direction, and a restricting portion extending from the bottom portion in a space between the inner raceway face and the outer raceway face.

In this case, an inner side face of each of the bottom portion and the restricting portion can be formed of a flat face having no curvature, further promoting discharging of the solid lubricant through the gap.

A sealing member that seals the space between the inner ring and the outer ring can be disposed on the axial outer side of the bottom portion of the restricting member, preventing the restricting member from falling off.

By making an outer diameter end and an inner diameter end of the bottom portion close to an inner circumferential face of the outer ring and an inner ring of the outer circumferential face, the bottom portion can keep generated solid lubricant powder around the raceway face. Thus, leakage of the solid lubricant powder to the outside of the bearing can be suppressed.

In the solid-lubrication rolling bearing, a pair of the restricting members are disposed on both axial sides of the rolling element and the separator, the pair of restricting members, and the rolling element and the separator that are accommodated within the restricting members are regarded as one unit, and the units are disposed at a plurality of places in the circumferential direction to allow relative movement between the units, thereby preventing leakage of the solid lubricant powder to the outside of the bearing more reliably.

A solid-lubrication rolling bearing according to the present invention includes an outer ring having an outer raceway face, an inner ring having an inner raceway face, a plurality of rolling elements disposed between the outer raceway face and the inner raceway face, and a separator disposed between the adjacent rolling elements to allow contact between the adjacent rolling elements, the separator being formed of the solid lubricant.

With such configuration, when the adjacent rolling elements get close to each other, the rolling elements contact each other, avoiding collision of the rolling elements with the separator. This can reduce an impact load exerted on the separator and prevent a damage on the separator due to shock.

In this case, when the rolling elements are disposed as full complement rolling elements, even if the separator becomes thin due to wear, all of the rolling elements can be prevented from being unevenly distributed in a partial circumferential region (especially, a region of not more than 180 degrees in the circumferential direction). For this reason, the outer ring is not separated from the inner ring even after long-term operation, preventing unintended disassembling of the bearing. Further, since many rolling elements are assembled in the bearing, the basic rated load of the bearing can be increased.

Preferably, the separator has receiving faces on both circumferential sides, the receiving faces capable of contacting the respective rolling elements, and an opening opened to the both receiving faces, and the adjacent rolling elements are brought into contact with each other via the opening. With such configuration, during operation of the bearing, the rolling elements contact the receiving faces and shave the receiving faces to generate solid lubricant powder, lubricating the bearing. Meanwhile, when the adjacent rolling elements get close to each other, the rolling element contact each other via the opening, preventing the rolling elements from strongly colliding with the receiving faces. This can prevent a damage on the separator due to impact.

The receiving faces of the separator are formed to make surface-contact with the rolling elements, stabilizing the position and posture of the separator during operation of the bearing to prevent the occurrence of noises caused by oscillation of the separator.

The above-mentioned solid-lubrication rolling bearing is especially suitable as a tenter clip bearing in a film stretching machine.

Advantageous Effects of Invention

The present invention, can provide a solid lubricant having high material strength and hardness as well as excellent impact resistance and wear resistance.

BRIEF DESCRIPTION OF THE DRAWINGS

FIG. 17b is a view illustrating the separator when viewed from a B direction in FIG. 17a.

FIG. 17c is a view illustrating the separator when viewed from a C direction in FIG. 17a.

FIG. 18 is a sectional view taken along A-A in FIG. 17a.

DESCRIPTION OF EMBODIMENTS

Embodiments of the present invention will be described below.

Figure 1:
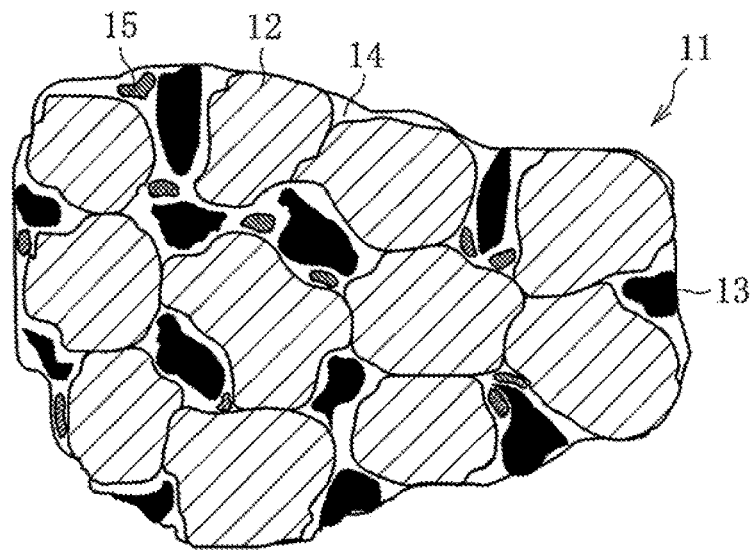
FIG. 1 is a view illustrating microstructure of a solid lubricant according to the present invention.

FIG. 1 illustrates enlarged microstructure of a solid lubricant according to the present invention.

As illustrated in this figure, a solid lubricant 11 is a porous body containing carbon material particles 12, graphite particles 13, a binder component 14 between the particles 12, 13, and pores 15. The carbon material particles 12 form skeleton structure in which the adjacent carbon material particles 12 are combined with each other. The binder component 14 and the graphite particles 13 are held in the skeleton structure of the carbon material particles 12.

The solid lubricant 11 is formed by filling a forming die with powder that includes carbon material powder, graphite powder, and a binder to mold the powder into predetermined shape, and then, removing the molded product from the forming die and firing it.

According to the present invention, amorphous and self-sintering (ability to be sintered by itself) carbon material powder is used as the carbon material powder. The carbon material powder is different from crystalline graphite powder due to its amorphous property, and is different from non self-sintering carbon fiber due to its self-sintering property. Examples of the carbon material powder include coke powder and pitch powder. Both of petroleum pitch powder and coal pitch powder can be used as the pitch powder.

Both of natural graphite powder and artificial graphite powder can be used as the graphite powder. The natural graphite powder is squamous and has excellent lubricity. The artificial graphite powder has excellent moldability. Accordingly, the natural graphite powder or the artificial graphite powder is selected according to required characteristics. The graphite powder is crystalline before and after firing. For example, phenol resin can be used as the binder.

Figure 2:
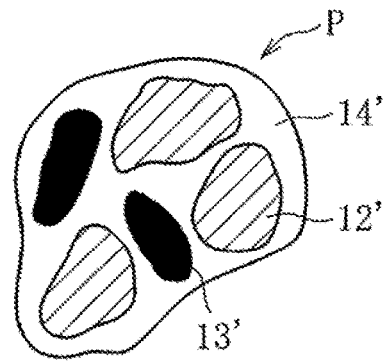
FIG. 2 is a sectional view illustrating configuration of granulated powder used in a manufacturing process of the solid lubricant.

The above-mentioned carbon material powder and graphite powder are granulated by adding the binder. Thereby, as illustrated in FIG. 2, granulated powder P in which carbon material powder 12' and graphite powder 13' are held by a binder 14' is manufactured. The carbon material powder 12' and the graphite powder 13' are fine powder and have poor fluidity, and thus, cannot smoothly fill the forming die. For this reason, they are granulated. The granulated powder P having a particle size of 600 μm or less (average particle diameter of 100 μm to 300 μm) is selected by pulverizing and filtering the granulated powder P.

The granulated powder thus obtained is supplied to the forming die, and is pressed to mold a green compact. At this time, for the ratio (weight ratio) of the carbon material powder 12', the graphite powder 13', and the binder 14' in the green compact, the ratio of the carbon material powder 12' is the highest, and the ratio of the binder 14' is the lowest. Specifically, the carbon material powder 12' of 50 to 60 wt % and the graphite powder 13' of 25 to 40 wt % are contained, and the remainder is occupied by binder 14' and inevitable impurities.

Then, by firing the green compact, the solid lubricant illustrated in FIG. 1 can be manufactured. The firing is performed using inert gas such as nitrogen gas as atmospheric gas at temperatures of 900° C. to 1000° C. in an oven. Through the firing, the carbon material powder 12' becomes the amorphous carbon material particles 12, and the graphite powder 13' becomes the crystalline graphite particles 13. The binder 14' becomes the binder component 14 that is amorphous carbon. Preferably, the density of the sintered solid lubricant 11 is 1.0 to 3.0 g/cm$^3$. When the density falls below the lower limit, a crack tends to occur, and when the density exceeds the upper limit, variation in size at molding (especially, variation in size in the compressing direction) becomes large.

Figure 3:
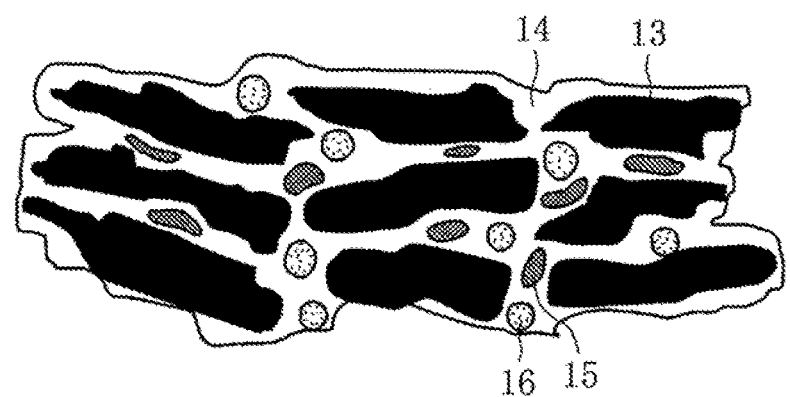
FIG. 3 is a view illustrating microstructure of a conventional solid lubricant.

FIG. 3 illustrates microstructure of a solid lubricant containing graphite as a main component in Patent literature 1. As illustrated in this figure, in the conventional solid lubricant, the graphite particles 13 are independent and are not combined with each other. The binder component 14 only holds the graphite particles 13, and is not combined with the graphite particles 13. Thus, the material strength is low, and the graphite particles tend to fall off. A reference numeral 16 in FIG. 3 denotes an additive such as tungsten.

On the contrary, in the solid lubricant 11 according to the present invention, the carbon material particles 12 function as a base material, and are combined with each other to form the skeleton structure. The binder component 14 is amorphous and self-sintering, and thus, is combined with the carbon material particles 12. Moreover, since the sintered carbon material particles 12 are hard, the sintered solid lubricant 11 has high hardness. As a result, the solid lubricant 11 has high material strength and hardness. The graphite particles 13 hardly fall off. Therefore, the solid lubricant having high lubricity as well as excellent impact resistance and wear resistance can be obtained.

The hardness of the solid lubricant 11 of the present invention reaches a Shore hardness (HSC) of about 50 to 100, and is much higher that the hardness of the existing solid lubricant described in Patent literature 1 (Shore hardness HSC: about 10 to 15). Due to the hardness, the solid lubricant 11 of the present invention can be machined later. The bending strength of the solid lubricant 11 of the present invention is 40 to 100 MPa, which is higher than the bending strength of the existing solid lubricant a few to dozens of times. The specific wear rate of the solid lubricant 11 of the present invention is 1.0 to 2.5×10−7 mm$^3$/(N·m) and is one-hundredth of the specific wear rate of the existing solid lubricant. Thus, the life of the bearing can be extended by using the solid lubricant 11 of the present invention as the solid lubricant disposed in the rolling bearing.

The skeleton structure of the carbon material particles 12 can be replaced with a skeleton structure in which metal particles such as Fe or Cu are combined with each other. However, this configuration tends to be fragile due to oxidation. At elevated temperatures, the material becomes soft, and both of material strength and hardness are lowered, which makes it difficult to be used as the solid lubricant. On the contrary, by adopting the skeleton structure of the carbon material particles 12 according to the present invention, oxidation and softening of the material at elevated temperatures are hard to occur, thereby avoiding such trouble.

Other composites can be added to the solid lubricant 11 as necessary. For example, wear resistance can be improved by adding at least one of W, Mo, and $MoS_2$. This addition can compensate lowering of wear resistance, which is caused by lowering of lubricity of graphite at elevated temperatures. When the amount of added composites is too large, material strength decreases. Thus, a suitable amount is 1.0 vol % to 8.0 vol %.

To further improve wear resistance after firing, carbon fiber or carbon nanotube can be added to the solid lubricant 11. However, when the amount of the carbon fiber or carbon nanotube is too much, moldability degrades. Thus, a suitable amount is 10 wt % or less.

Figure 4:
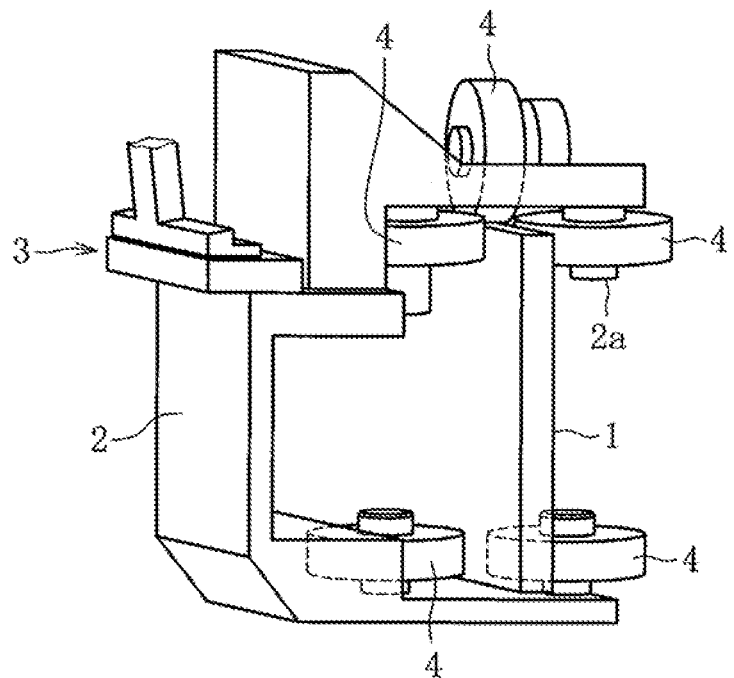
FIG. 4 is a perspective view illustrating schematic structure of a tenter clip.
Figure 25:
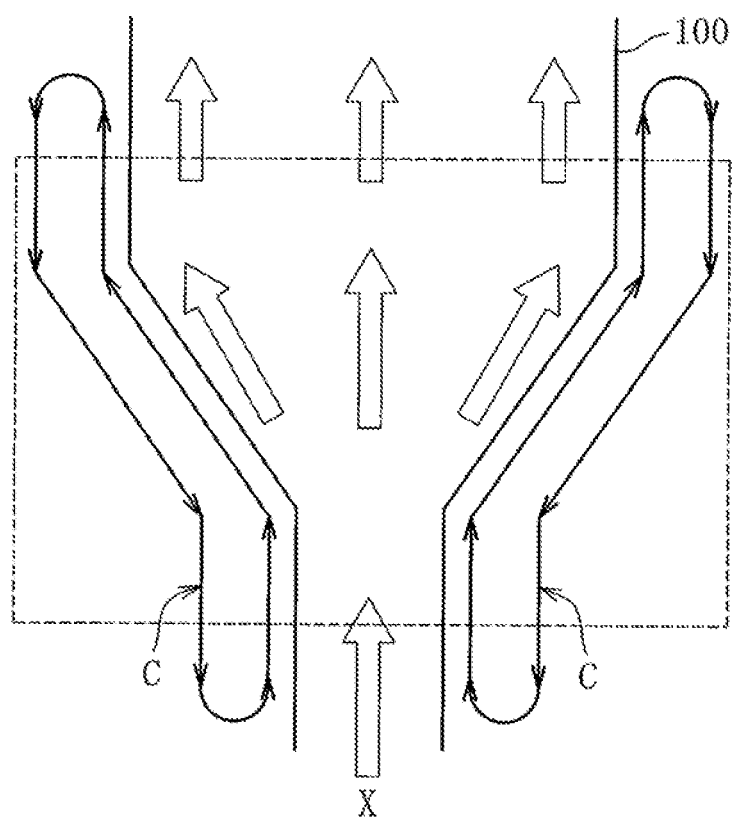
FIG. 25 is a plan view illustrating schematic configuration of a film stretching machine.

For example, the solid lubricant 11 is used for a rolling bearing for tenter clip of a film stretching machine. FIG. 4 illustrates schematic structure of the tenter clip of the film stretching machine. As described above, the tenter clip moves under guide of a caterpillar guide rail 1, and includes a frame 2, a clip 3 that clips a film 100 (See FIG. 25), and a plurality of bearings 4 rotatably supported by the frame 2. The tenter clip is driven by a chain not illustrated to travel. At this time, an outer circumferential face of each of the bearings 4 rolls on the guide rail 1, thereby moving the tenter clip along the guide rail 1 to stretch a film clipped by the clip 12. Another ring-like member engaged with an outer circumferential face of an outer ring of the bearing may roll on the guide rail 1.

The solid lubricant 11 is suitable for use in a rolling bearing (solid-lubrication rolling bearing.). Solid-lubrication rolling bearings using the solid lubricant in accordance with first to sixth embodiments will be described below with reference to FIG. 5 to FIG. 24.

First Embodiment

Figure 5:
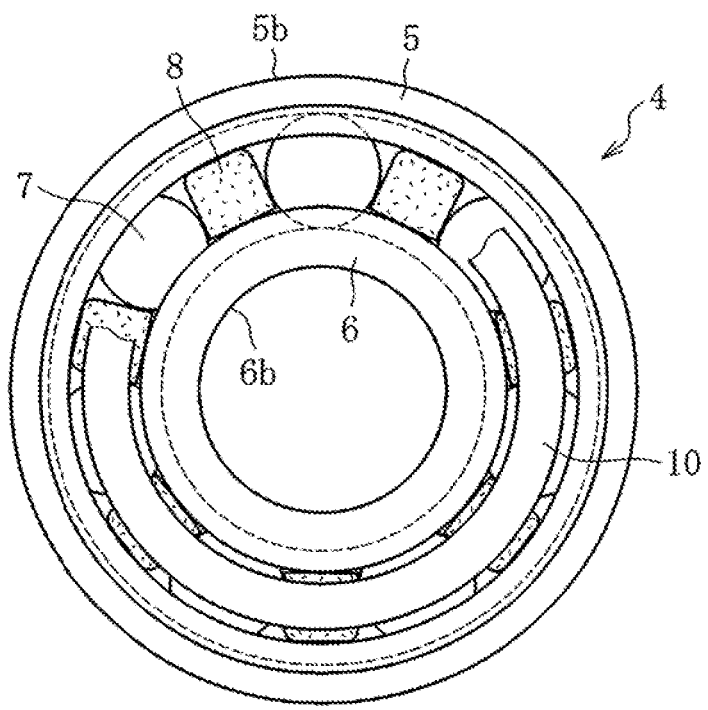
FIG. 5 is a front view illustrating a solid-lubrication rolling bearing (first embodiment).
Figure 6:
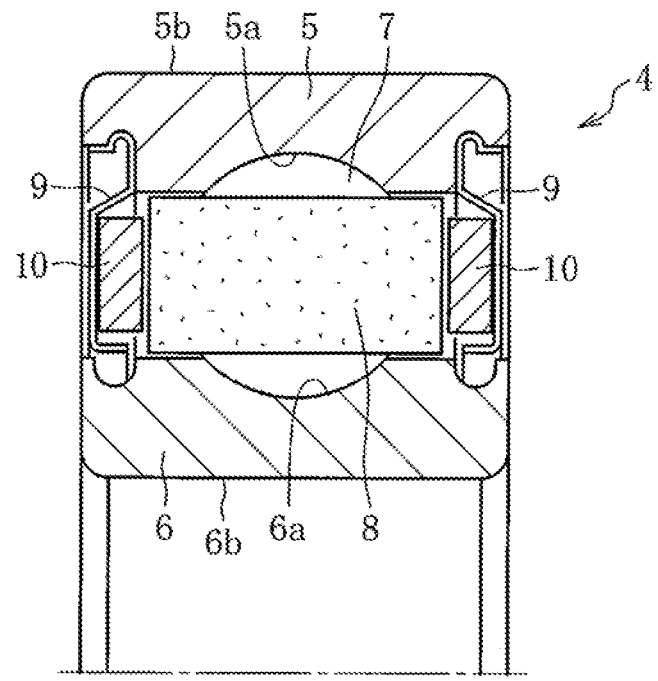
FIG. 6 is a sectional view illustrating the solid-lubrication rolling bearing (first embodiment).

FIG. 5 is a front view illustrating a solid-lubrication rolling bearing 4 in accordance with a first embodiment (however, a shield plate 9 is removed), and FIG. 6 is a sectional view of the bearing taken along the radial direction. As illustrated in FIG. 5 and FIG. 6, the bearing 4 is shaped as a deep groove ball bearing, and includes, as main constituents, an outer ring 5 having an outer raceway face 5a on its inner circumferential face, an inner ring 6 having an inner raceway face 6a on its outer circumferential face, a plurality of (six in this embodiment) rolling elements 7 such as balls disposed between the outer raceway face 5a and the inner raceway face 6a, a plurality of (six in this embodiment) separators 8 disposed between the adjacent rolling elements 7, a sealing member 9 that seals a space between the outer ring 5 and the inner ring 6 on both axial sides, and lubrication rings 10 disposed between the sealing member 9 and the rolling elements 7. In the bearing 4 in this embodiment, the outer circumferential face 5b of the outer ring 5 becomes a rolling face that rolls on the guide rail 1 in FIG. 1, and an inner circumferential face 6b of the inner ring 6 fixedly engages with a fixed shaft 2a provided at the frame 2.

The sealing member 9 is formed of a shield plate, for example. An outer diameter end of the shield plate 9 is fixedly press-fitted into a circumferential groove in the inner circumferential face of the outer ring 5, and an inner diameter end of the shield plate 9 comes close to the outer circumferential face of the inner ring 6. This configuration forms a non-contact seal. A contact seal may be formed by bringing the inner diameter end of the sealing member 9 into slide contact with the outer circumferential face of the inner ring 6.

The outer ring 5, the inner ring 6, and the rolling elements 7 are made of steel, for example, martensitic stainless steels such as SUS440C. The rolling elements may be made of ceramics, and examples of the ceramics include silicon nitride. When the rolling elements 7 are not made of ceramics, the rolling elements 7 are preferably coated with a solid-lubrication material such as graphite. Preferably, the shield plate 9 is made of steel, for example, austenitic stainless steels such as SUS304 having excellent corrosion resistance.

In the configuration of the bearing, one of both of the separator 8 and the lubrication ring 10 is formed of the above-mentioned solid lubricant 11 (FIG. 1). The lubrication rings 10 may be omitted if unnecessary.

In the solid-lubrication rolling bearing 4 thus configured, during rotation of the bearing, the rotating and revolving rolling elements 7 slidingly contact the separators 8 and the lubrication rings 10, so that the separators 8 and the lubrication rings 10 are shaved to generate the solid lubricant powder. The solid lubricant powder is transferred and attached onto the outer raceway face 5a and the inner raceway face 6a. Therefore, the bearings 4 are stably lubricated without lubricating oil, grease, or the like. The separators 8 and the lubrication rings 10 are formed of the solid lubricant 11 having excellent wear resistance, thereby preventing their premature wear and keeping the lubricating effect of the solid lubricant 11 for a long period. During operation of the bearing, the separators 8 collide with the rolling elements 7 and may become thin due to wear. However, the solid lubricant 11 having excellent impact resistance can prevent a damage on the separators 8 due to such collision. Therefore, the life of the solid-lubrication rolling bearings 4 for the tenter clip can be extended.

Second Embodiment

Figure 7:
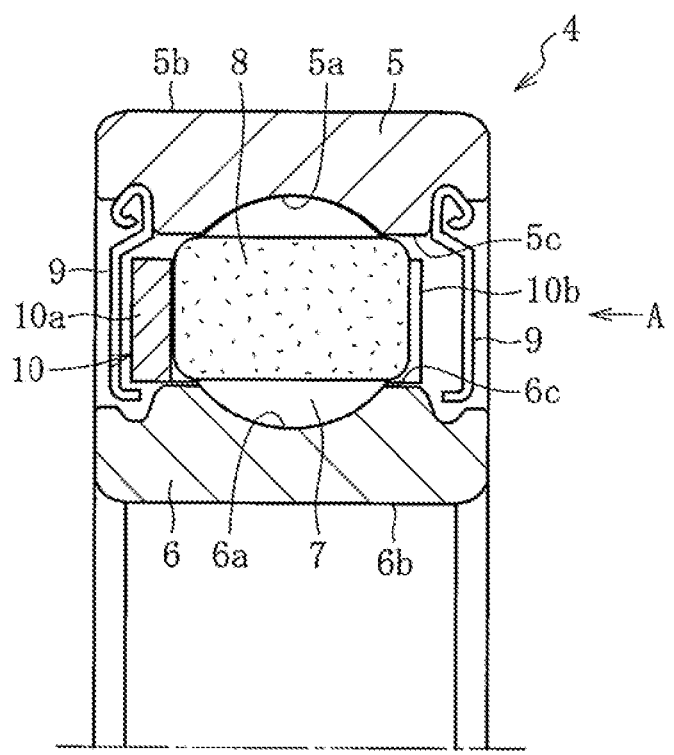
FIG. 7 is a sectional view illustrating a solid-lubrication rolling bearing (second embodiment).
Figure 8:
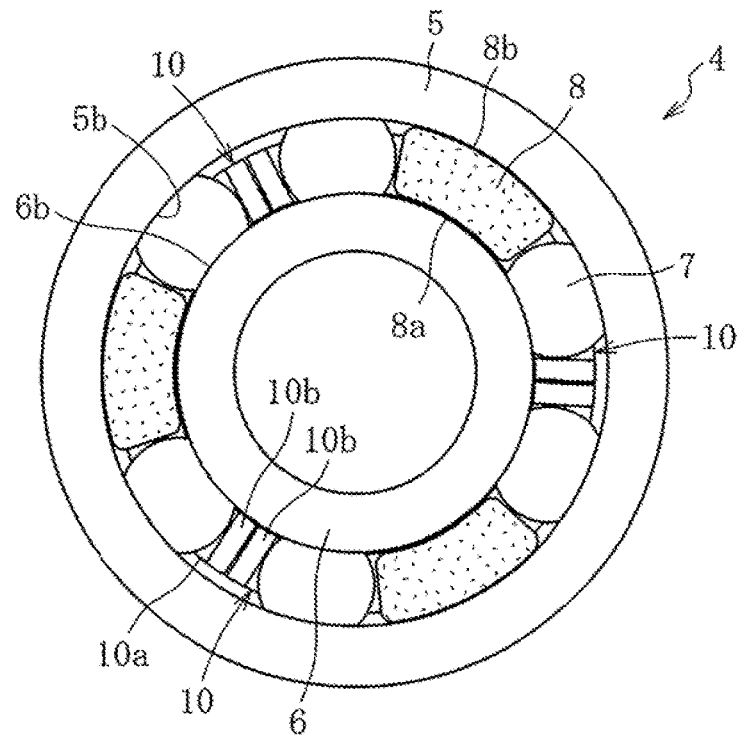
FIG. 8 is a front view illustrating a solid-lubrication rolling bearing (second embodiment).

FIG. 7 is a sectional view illustrating a solid-lubrication rolling bearing 4 using the solid lubricant 11 in accordance with a second embodiment, and FIG. 8 is a front view of the bearing 4 in FIG. 7 when viewed from an A direction (however, the right shield plate 9 in FIG. 7 is removed). Basic configuration of the solid-lubrication rolling bearing 4 in the second embodiment is the same as that in the first embodiment. For this reason, in following description of the second embodiment, the same components as those in the bearings 4 in the first embodiment are given the same reference numerals and description thereof is omitted, and differences between this embodiment and the first embodiment will be mainly described.

The separators 8 are formed of the solid lubricant 11. The separators 8 in the first embodiment each are shaped like a rectangular parallelepiped, but the separators 8 in the second embodiment are partially cylindrical. The thickness of the separator 8 in the radial direction is slightly smaller than a difference between a radius of the inner circumferential face of the outer ring 5 (shoulder face 5c adjacent to the outer raceway face 5a) and a radius of the outer circumferential face of the inner ring 6 (shoulder face 6c adjacent to the inner raceway face 6a). An axial dimension of the separator 8 is larger than an axial dimension of the outer raceway face 5a and the inner raceway face 6a. Accordingly, during rotation of the bearing, the outer circumferential faces and the inner circumferential faces of the separators 8 at both axial ends can slidingly contact the shoulder faces 5c, 6c of the outer ring 5 and the inner ring 6.

Figure 14A:
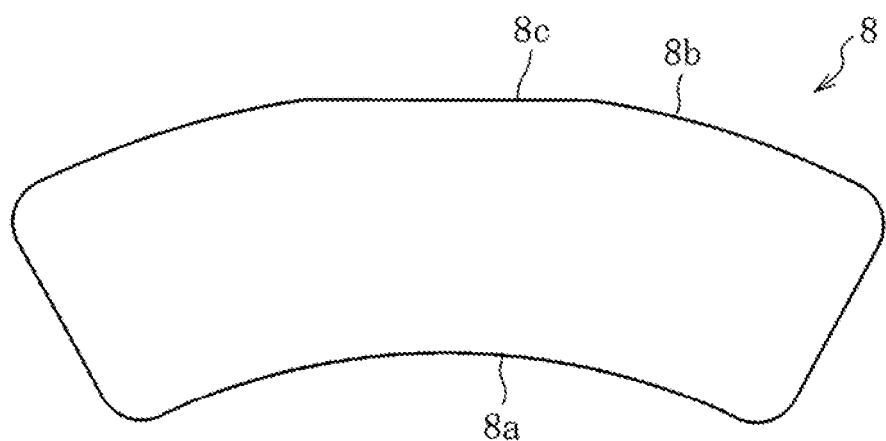
FIG. 14a is a front view illustrating a separator when viewed in the axial direction.
Figure 14B:
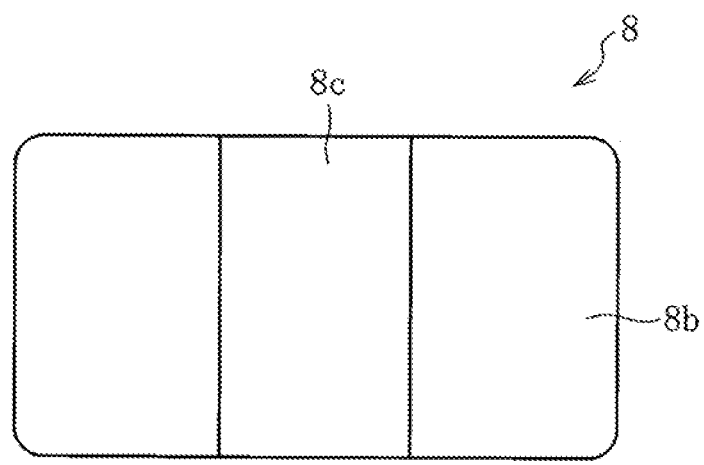
FIG. 14b is a plan view illustrating the separator when viewed in the radial direction.

In FIG. 8, inner circumferential faces 8a (faces opposed to the outer circumferential face of the inner ring 6) and outer circumferential faces 8b (faces opposed to the inner circumferential face of the outer ring 5) of the separators 8 each are is cylindrical face using the axis as the center. However, as illustrated in FIG. 14a and FIG. 14b, a flat face 8c may be formed in a circumferential central region of the outer circumferential faces 8b of the separator 8.

Figure 9:
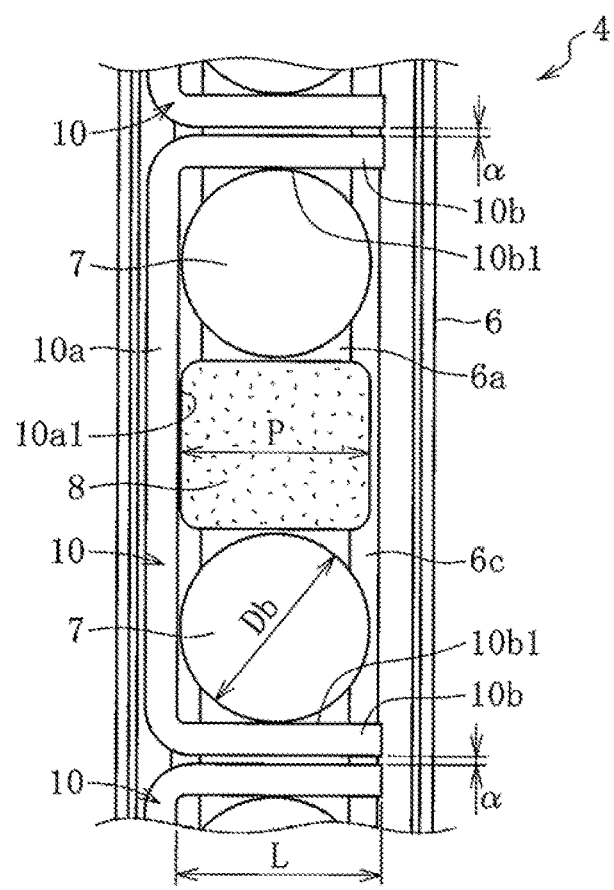
FIG. 9 is a partial exploded view illustrating the solid-lubrication rolling bearing in FIG. 8 when viewed from the outer diameter side, with an outer ring being removed.

The solid-lubrication rolling bearings 4 in the second embodiment each further include, as a main constituent, restricting members 10 that hold the adjacent rolling element 7 and separator 8 from both circumferential sides to restrict relative movement of the rolling element 7 and separator 8 in a direction of separating apart in the circumferential direction. Configuration of the restricting members 10 will be described below in detail with respect to FIG. 9 and FIG. 10. FIG. 9 is a partial exploded view illustrating the solid-lubrication rolling bearing 4 in FIG. 8 when viewed from the outer diameter side, with the outer ring 5 being removed, and FIG. 10 is a perspective view illustrating the restricting member 10.

Figure 10:
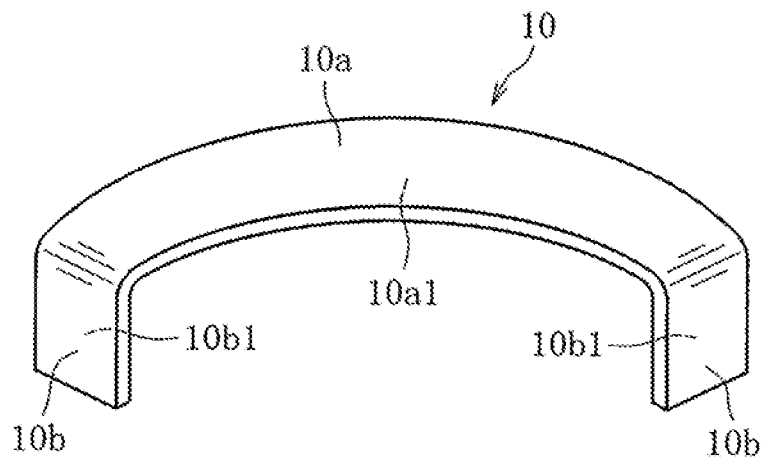
FIG. 10 is a perspective view illustrating a restricting member.

As illustrated in FIG. 9 and FIG. 10, the restricting members 10 each have a bottom portion 10a extending between the outer ring 5 and the inner ring 6 in the circumferential direction, and restricting portions 10b extending from both circumferential ends of the bottom portion 10a in a direction perpendicular to the face of the bottom portion 10a (axial direction), in an integral manner. All of inner side face 10a1 of the bottom portion 10a and the inner side faces 10b1 of the restricting portions 10, which are opposed to the rolling elements 7 and the separator 8, are flat faces having no curvature. As illustrated in FIG. 9, an axial length L of the restricting portion 10b (especially, inner side face 10b1) is slightly larger than a diameter Db of the rolling element 7 and an axial dimension P of the separator 8 (L>Db, L>P).

The restricting members 10 each have a thickness of about 0.1 mm to 1.0 mm (in FIG. 7 to FIG. 9, for clarity, the thickness of the restricting member 10 is exaggerated), and can be manufactured by pressing, for example, a metal thin plate. The restricting members 10 may be made of any material, for example, an iron-based material such as stainless steel, or iron-based material coated with chromium plating or the like for ensuring corrosion resistance. Alternatively, the restricting members 10 may be formed of the solid lubricant 11.

As illustrated in FIG. 7 and FIG. 8, the bottom portion 10a of the restricting member 10 is disposed between the inner circumferential face of the outer ring 5 and the outer circumferential face of the inner ring 6, and the restricting portions 10b are disposed in a space between the outer raceway face 5a of the outer ring 5 and the inner raceway face of the inner ring 6. Specifically, the bottom portion 10a extends between the inner circumferential face of the outer ring 5 and the outer circumferential face of the inner ring 6 in the bearing circumferential direction, and is perpendicular to the rotational center of the bearing. The restricting portions 10b extend from both circumferential ends of the bottom portion 10a in the bearing axial direction, and cross the revolution track of the rolling element 7. At least one rolling element 7 and at least one separator 8 are disposed between the two restricting portions 10b of the restricting member 10. In this embodiment, the two rolling elements 7 are disposed between the two restricting portions 10b of the restricting member 10, and one separator 8 is disposed between the two rolling elements 7. That is, the two rolling elements 7 and one separator 7 are arranged as one set. A circumferential size of the inner side faces 10b1 of the two restricting portions 10b of the restricting member 10 is set such that the rolling elements 7 and the separator 8 between the inner side faces 10b1 can slightly move in the circumferential direction.

As illustrated in FIG. 8 and FIG. 9, the restricting members 10 are disposed at a plurality of (preferably, three or more) places in the circumferential direction. At this time, all of the restricting members 10 have the same shape. No rolling element 7 and separator 8 are disposed between the restricting portions 10b of the adjacent restricting members 10, and the restricting portions 10b are opposed to each other in the circumferential direction. Accordingly, all of the rolling dements 7 and the separators 8 are disposed between the restricting portions 10b of any restricting member 10. The adjacent restricting members 10 are not connected to each other, and as illustrated in FIG. 9, a circumferential minute gap α is present between the opposed restricting portions 10b of the adjacent restricting members 10.

A radial dimension of the restricting member 10 is slightly smaller than a difference between a radius of the shoulder face 5c of the outer ring 5 and a radius of the shoulder face 6c of the inner ring 6, and the outer diameter end and the inner diameter end of the bottom portion 10a are close to the inner circumferential face (shoulder face 5c) of the outer ring 5 and the outer circumferential face (shoulder face 6c) of the inner ring 6, respectively. In this embodiment, a gap between the inner diameter end of the bottom portion 10a and the shoulder face 6c of the inner ring 8 is smaller than a gap between the outer diameter end of the bottom portion 10a and the shoulder face 5c of the outer ring 5. The minute gap α between the adjacent restricting members 10 can be set such that the inner diameter end of the bottom portion 10a do not contact the outer circumferential face (shoulder face 6c) of the inner ring 6. However, the gap may be set such that the inner diameter end of the bottom portion 10a temporarily contacts the outer circumferential face (shoulder face 6c) of the inner ring 6 during rotation of the restricting member 10, if this causes no problem. Since the bottom portion 10a is thick in FIG. 7, the outer diameter end of the bottom portion 10a contacts the shield plate 9, and do not contact the inner circumferential face of the outer ring 5 (shoulder face 5c). However, thinning the bottom portion 10a may cause the outer diameter end of the bottom portion 10a to contact the inner circumferential face of the outer ring 5.

The restricting members 10 are assembled between the outer ring 5 and the inner ring 6 in the same orientation such that the bottom portions 10a are disposed on one axial side of the bearing. The restricting members 10 may be equally oriented, or may be partially turned (for example, alternatively turned). The restricting members 10 may be assembled in any stage before or after assembling the rolling elements 7 and the separators 8 between the outer ring 5 and the inner ring 6. Upon completion of assembling of the rolling elements 7, the separators 8, and the restricting members 10, the shield plate 9 is press-fitted into a circumferential groove of the outer ring 5 to complete the solid-lubrication rolling bearing 4 illustrated in FIG. 7. In this state, since the restricting members 10 are constrained by the sealing member 9 from the axial outer side, the restricting members 10 do not fall out of the bearing 4. To constrain movement of the restricting members 10 to the opening side (right side in FIG. 7), a ring-like member may be attached to the outer ring 5 (or the inner ring 6) and the member is disposed between the right shield plate 9 and a front end of the restricting portion 10*a* to contact the front end of the restricting portion 10*a*.

In the solid-lubrication rolling bearing 4 thus configured, during rotation of the bearing, the rotating and revolving rolling element 7 contact the separator 8, so that the separator 8 formed of the solid lubricant 11 are shaved to generate solid lubricant powder (including small pieces of the solid lubricant). The solid lubricant powder is transferred and attached onto the outer raceway face 5*a* and the inner raceway face 6*a*. Therefore, the bearing 4 are stably lubricated without lubricating oil, grease, or the like.

The separators 8 become smaller during operation of the bearing due to wear. In this case, however, since the moving range of each rolling element 7 in the circumferential direction is restricted by the restricting members 10, all of the rolling elements 7 are prevented from being unevenly distributed in a partial circumferential region. For this reason, the outer ring 5 is not separated from the inner ring 6 after long-term operation, thereby preventing unintended disassembling of the bearing. When three or more restricting members 10 are used as in this embodiment, the situation where all of the rolling elements 7 move in a region of 180 degrees or less never occurs theoretically. Thus, the above trouble can be reliably prevented.

From the above configuration, the restricting members 10 can relatively move in all directions (axial direction, circumferential direction, and radial direction). Consequently, even in an initial stage (wear of the separators 8 does not worsen), dimension of gaps between the rolling element 7, and the inner side faces 10*a*1, 10*b*1 of the restricting member 10 can be flexibly changed. Thus, discharging of the solid lubricant powder accumulated in the gaps can be promoted, so that the solid lubricant powder is prevented from filling the gaps to cause rotational locking. The effect of promoting discharging of the solid lubricant powder from the gaps can be further enhanced by forming the inner side face 10*a*1 of the bottom portion 10*a* and the inner side faces 10*b*1 of the restricting portions 10*b* as flat faces having no curvature, as illustrated in FIG. 9.

In some conventional solid-lubrication rolling bearings, a retainer holds the separator and the rolling elements with rivets. On the contrary, according to the present invention, since a connecting member such as the rivet is unnecessary, there is no need to ensure a set-up space for the connecting member in the circumferential direction. Thus, many rolling elements 7 can be incorporated in the bearing to increase the basic rated load of the bearing. Further, the operation of connecting the restricting members 10 to each other becomes unnecessary, so that man-hour at assembling of the bearing can be reduced to achieve cost reduction.

Further, since the outer diameter end and the inner diameter end of the bottom portion 10*a* of the restricting members 10 are made close to the inner circumferential face of the outer ring 5 and the outer circumferential face of the inner ring 6, the bottom portion 10*a* can shield the solid lubricant powder generated by contact between the rolling elements 7 and the separators 8 to keep the solid lubricant powder near the raceway faces 5*a*, 6*a*. Thus, leakage (especially, leakage to the left in FIG. 7) of the solid lubricant powder to the outside of the bearing can be reliably prevented.

Since the restricting members 10 have the same shape, processing costs of the restricting members 10 can be reduced, so that costs of the solid-lubrication rolling bearings 4 can be further reduced.

Third Embodiment

Figure 11:
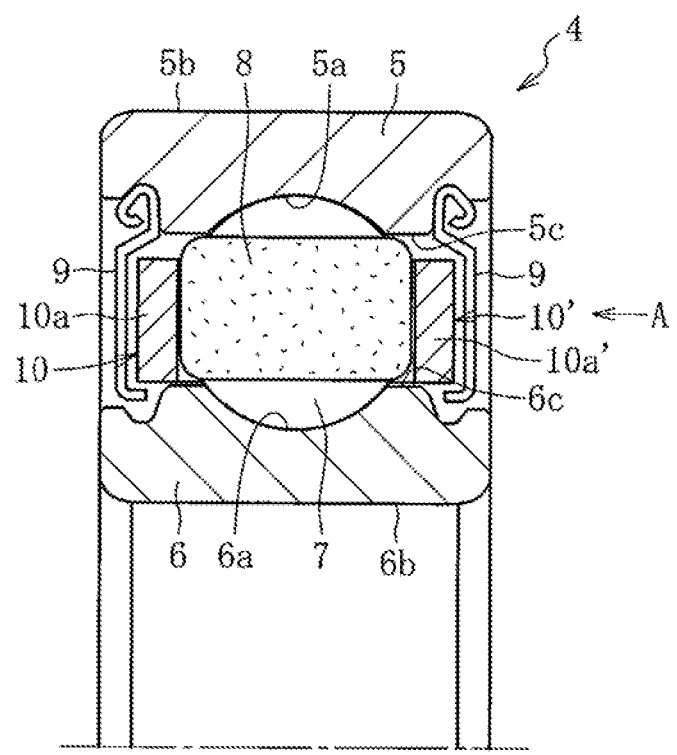
FIG. 11 is a sectional view illustrating a solid-lubrication rolling bearing (third embodiment).
Figure 12:
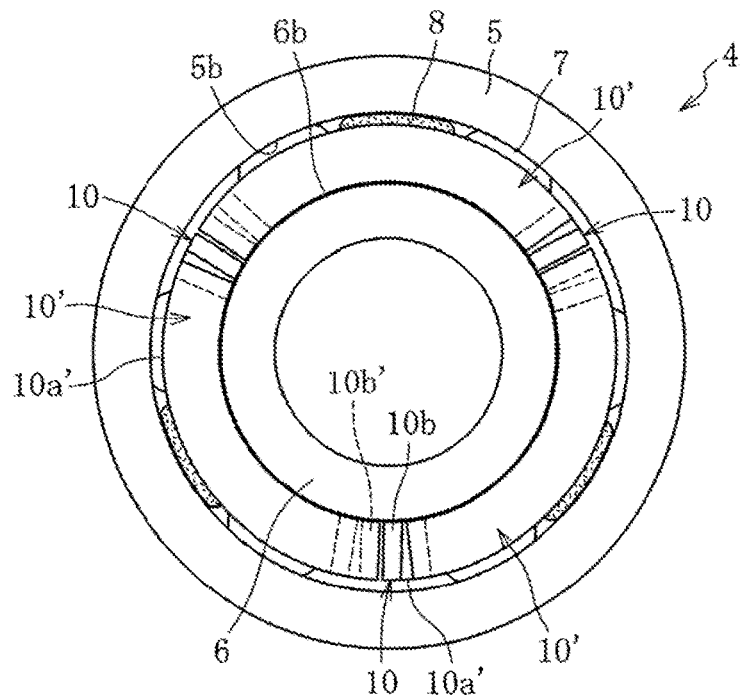
FIG. 12 is a front view illustrating the solid-lubrication rolling bearing (third embodiment).
Figure 13:
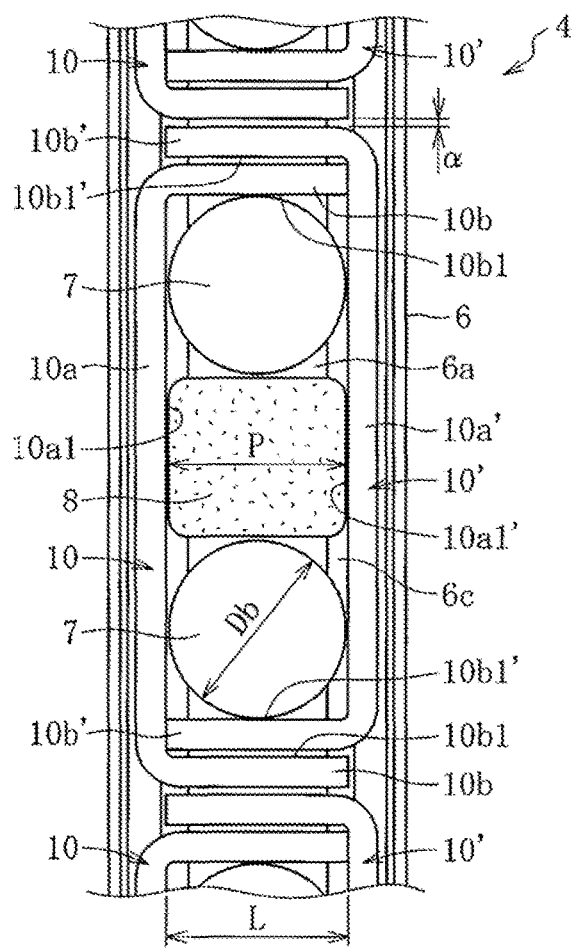
FIG. 13 is a partial exploded view illustrating the solid-lubrication rolling bearing in FIG. 12 when viewed from the outer diameter side, with an outer ring being removed.

Next, a solid-lubrication rolling bearing in accordance with a third embodiment of the present invention will be described with reference to FIG. 11 to FIG. 13.

In the second embodiment, the restricting members are disposed on one axial side of the rolling elements 7 and the separators 8. In the third embodiment, a pair of restricting members 10, 10' of the same shape sandwich the rolling elements 7 and the separators 8 on both axial sides. In the third embodiment, portions of the restricting members 10' on the other axial side, out of the pair of restricting members 10, 10', which correspond to portions of the restricting members 10 on one axial side, are given common reference numerals followed by symbol (').

In the third embodiment, in the pair of restricting members 10, 10', the bottom portion 10*a*, 10*a*' are opposed to each other in the axial direction, and the restricting portions 10*b*, 10*b*' are opposed to each other in the circumferential direction. The pair of restricting members 10, 10' are not connected to each other. The same number of rolling elements 7 and separator 8 as the rolling elements 7 and separator 8 in the first embodiment are stored in a space surrounded with inner side faces 10*a*1, 10*a*1' of the bottom portions 10*a*, 10*a*', the inner side faces 10*b*1 of the restricting portions 10*b* of the restricting member 10 one axial side, and inner side faces 10*b*1' of the restricting portions 10*b*' of the restricting member 10' on the other axial side. The separators 8 are made of the solid lubricant 11. An axial length L of each of the restricting portions 10*b*, 10*b*' (a minimum axial distance between the inner side faces 10*a*1, 10*a*1' of the opposed bottom portion 10*a*, 10*a*') is slightly larger than a diameter Db of the rolling element 7 and an axial dimension P of the separator 8 (L>Db, L>P), such that front ends of the restricting portions 10*b*, 10*b*' can contact the bottom portions 10*a*', 10*a* of the corresponding restricting members.

In the bearing 4 in this embodiment, the pair of restricting members 10, 10', the rolling elements 7, and the separator 8 are used as one unit, and the units are disposed at a plurality of places (three places in the figure) in the circumferential direction. The minute gap α being the same as the first embodiment is formed between the adjacent units in the circumferential direction.

The configuration in the third embodiment can achieve the same effect as the configuration in the second embodiment. The restricting members 10, 10' are prevented from falling off by shield plates 9 on both axial sides. With the configuration in the third embodiment, since the bottom portion 10*a*, 10*a*' are disposed on the both axial sides of the rolling elements 7 and the separator 8, leakage of the solid lubricant powder to both axial sides can be suppressed, thereby preventing leakage of the solid lubricant to the outside of the bearing more reliably. Although the restricting portions 10*b*, 10*b*' of the pair of restricting members 10, 10' are loosely engaged with each other, the restricting portions 10*b*, 10*b*' may be tightly engaged with each other to integrate the unit.

Fourth Embodiment

Figure 15:
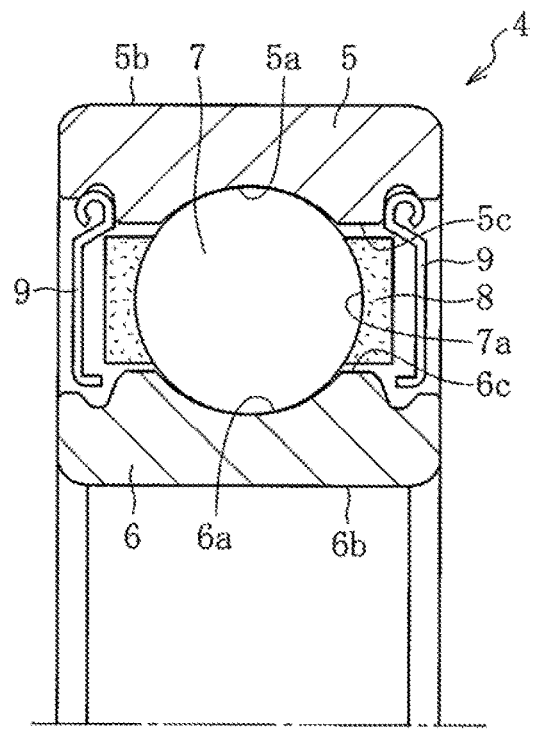
FIG. 15 is an axial sectional view illustrating a solid-lubrication rolling bearing (fourth embodiment).
Figure 16:
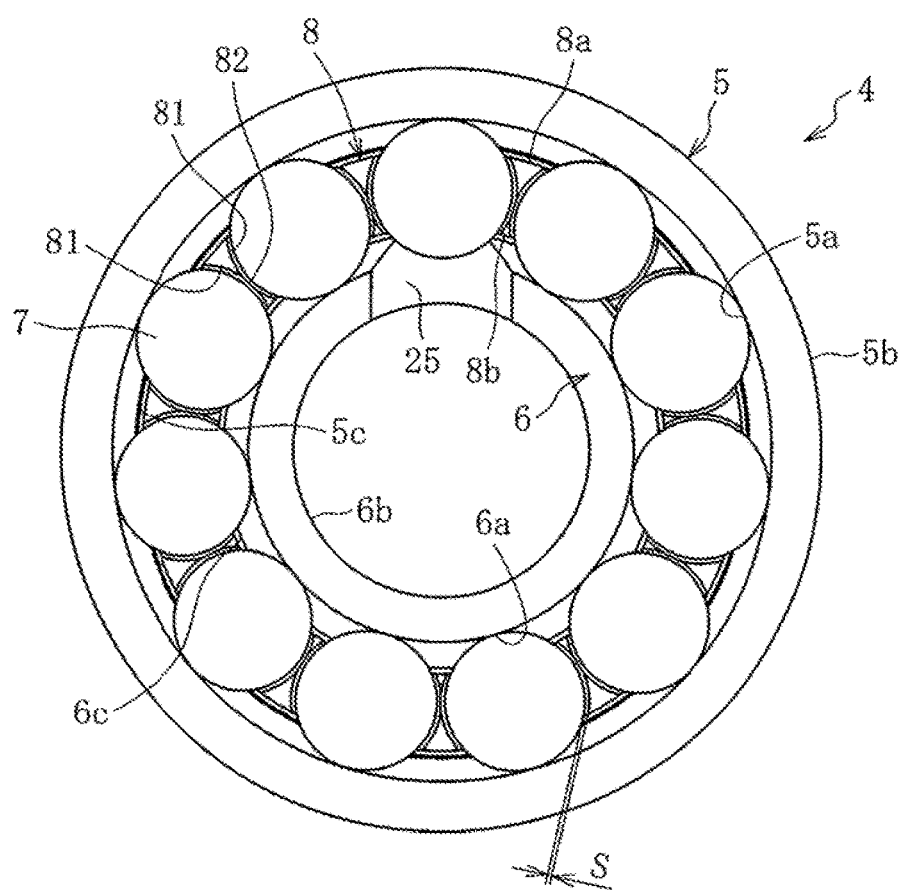
FIG. 16 is a sectional view illustrating the solid-lubrication rolling bearing (fourth embodiment) taken along the radial direction.

FIG. 15 is an axial sectional view illustrating a solid-lubrication rolling bearing 4 in accordance with a fourth embodiment, and FIG. 16 is a radial sectional view illustrating the solid-lubrication rolling bearing.

Figure 24:
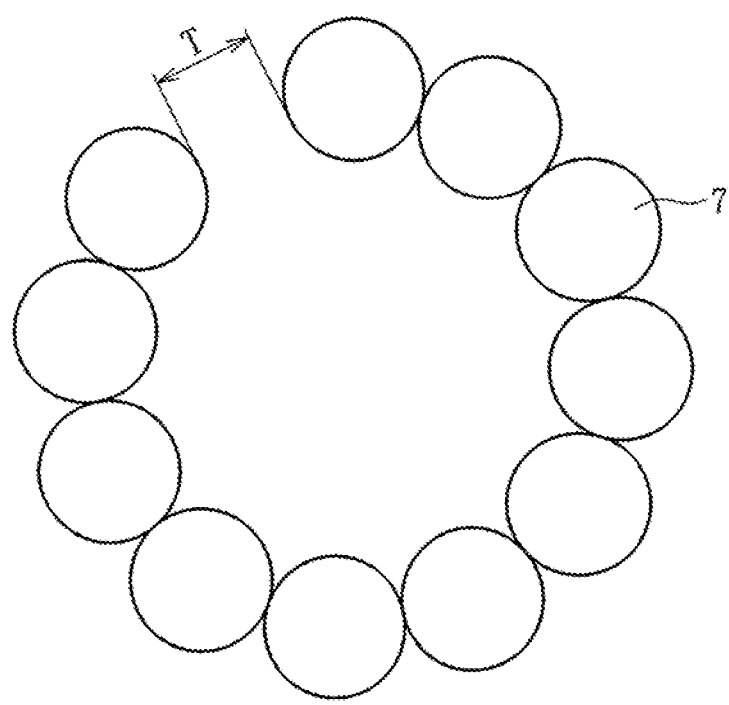
FIG. 24 is a front view illustrating rolling elements disposed in a full complement rolling element mode.

In the fourth embodiment, roiling elements 7 are disposed as full complement rolling elements. Thus, the bearing 4 has no retainer that holds the rolling elements 7 at regular intervals in the circumferential direction. The full complement rolling elements mean that, as illustrated in FIG. 24, a total T of gaps between the rolling elements 7 does not exceed the diameter of the rolling element 7.

Figure 17A:
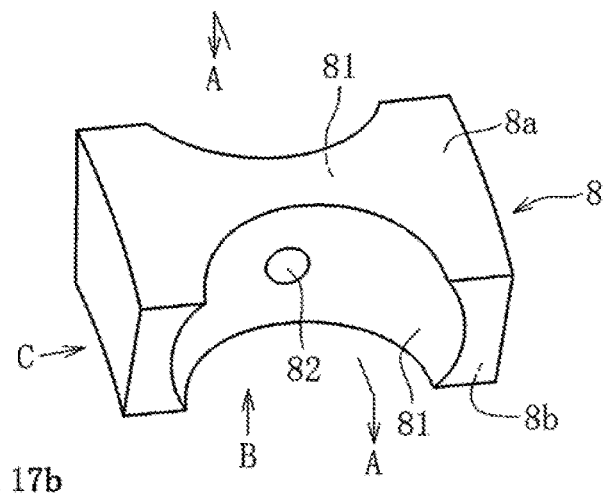
FIG. 17a is a perspective view illustrating a separator used in the solid-lubrication rolling bearing in FIG. 16.
Figure 17B:
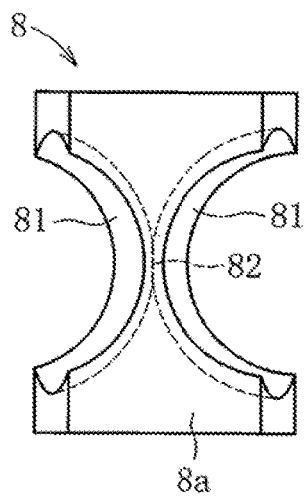
Figure 17C:
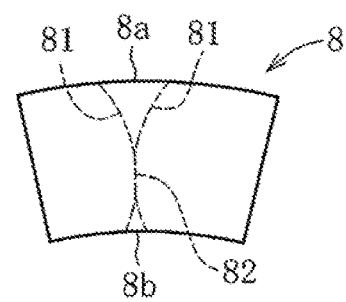

Also in the fourth embodiment, the separators 8 are formed of the solid lubricant 11. FIG. 17a to FIG. 17c each illustrate an example of the shape of the separator 8. FIG. 17a is a perspective view illustrating the separator 8 when viewed from the outer diameter side. FIG. 17b is a view illustrating the separator 8 when viewed from a direction of an arrow B in FIG. 17a (inner diameter side), and FIG. 17c is a view illustrating the separator 8 when viewed from a direction of an arrow C in FIG. 17a (axial direction).

Figure 18:
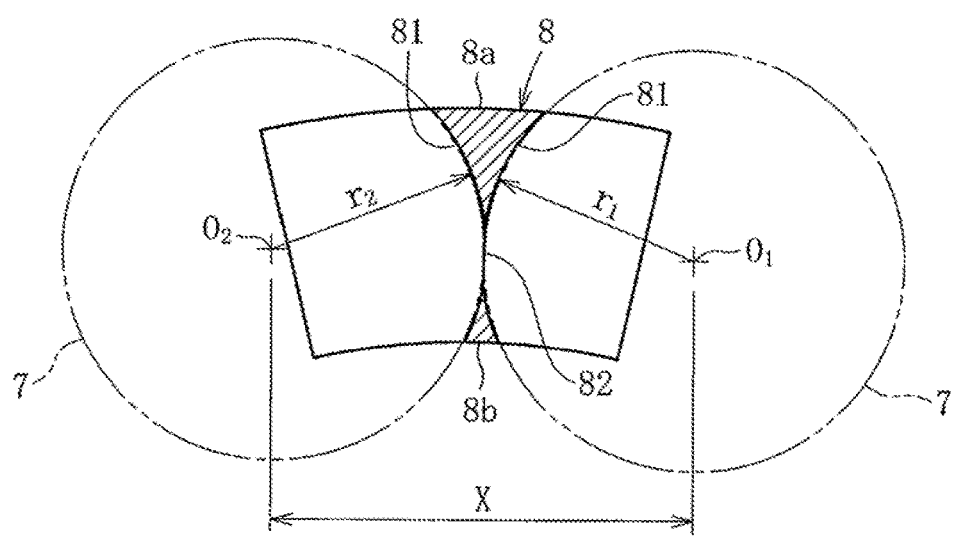

As illustrated in FIG. 17a to FIG. 17c, receiving faces 81 that can make surface-contact with the faces of the rolling elements 7 are formed on both circumferential sides of the separator 8. In this embodiment, since a ball is used as the rolling element 7, the receiving faces 81 are partial recessed spherical faces that make contact with the faces of the balls 7. As illustrated in FIG. 18, a distance X between a curvature center O1 of one receiving face 81 and a curvature center O2 of the other receiving face 81 is slightly smaller than a sum of a curvature radius r1 of one receiving face 81 and a curvature radius r2 of the other receiving face 81 (X<r1+r2). That is, on a plane orthogonal to the axial direction including the curvature centers O1, O2 (plane along the sheet of FIG. 18), an arc including a generating line of one receiving face 81 crosses an arc including a generating line of the other receiving face 81. Thus, an opening 82 opened to the receiving faces 81 on both sides is formed at the deepest part of the receiving faces 81, at which the two arcs cross each other. Preferably, an edge of the opening 82 is rounded by machining so as not to be sharp.

The outer circumferential face 8a (face opposed to the inner circumferential face of the outer ring 5) and the inner circumferential faces 8b (face opposed to the outer circumferential face of the inner ring 6) of the separator 8 each are cylindrical about the axis. As illustrated in FIG. 17c and FIG. 18, on the plane orthogonal to the axial direction including the curvature centers O1, O2 of the receiving faces 81, a circumferential length of the outer circumferential face 8a of the separator 8 is larger than a circumferential length of the inner circumferential face 8b. As illustrated in FIG. 15, the thickness of the separator 8 in the radial direction is slightly smaller than a difference between a radius of the inner circumferential face (shoulder face 5c adjacent to the outer raceway face 5a) of the outer ring 5 and a radius of the outer circumferential face (shoulder face 6c adjacent to the inner raceway face 6a) of the inner ring 6. The axial dimension of the separator 8 is larger than the axial dimension of the outer raceway face 5a and the inner raceway face 6a.

The above-mentioned solid-lubrication rolling bearing 4 is assembled by assembling a plurality of rolling elements 7 and separators 8 between the outer ring 5 and the inner ring 6, and fixedly press-fitting the sealing member 9 into a circumferential groove of the outer ring 5. At this time, as illustrated in FIG. 16, the rolling elements 7 and the separators 8 are alternately disposed in the circumferential direction. In the state where all of the rolling elements 7 and the separators 8 are assembled, a circumferential minute gap S is generated between the face of the rolling element 7 and the receiving face 81 of the separator 8. To smoothly assemble the rolling elements 7, a receiving hole 25 is preferably provided in the inner ring 6. The receiving hole 25 may be formed in the outer ring 5.

In the solid-lubrication rolling bearings 4 thus configured, during rotation of the bearing, the face of the rolling element 7 contacts the receiving faces 81 of the separator 8, so that the separator 8 is shaved to generate solid lubricant powder (including small pieces of the solid lubricant). The solid lubricant powder is transferred and attached onto the outer raceway face 5a and the inner raceway face 6a, so that the bearing 4 is stably lubricated without lubricating oil, grease, or the like.

During long-term operation of the bearing 4, the separators 8 gradually become smaller due to wear and accordingly, the circumferential gap S between the rolling element 7 and the separator 8 gradually becomes larger. However, since the bearing 4 has no retainer, and the rolling elements 7 are full complement rolling elements, even when the separators 8 become thin, all of the rolling elements are prevented from being unevenly distributed in a circumferential limited region (circumferential region of 180 degrees or less). For this reason, even after long-term operation, the outer ring 5 is not separated from the inner ring 6, thereby preventing unintended disassembling of the bearing 4. Many rolling elements 7 can be incorporated into the bearing to increase the basic rated load of the bearing 4.

As the separators 8 become thinner, the adjacent rolling elements 7 get close to each other at higher speed. In this case, as illustrated in FIG. 18, the rolling elements 7 collide with each other before the rolling elements 7 contact the receiving faces 81 of the separator 8. For this reason, the contact pressure between the faces of the rolling elements 7 and the receiving faces 81 of the separator 8 is reduced to decrease shock on the separator 8. This can prevent damage on the separator 8 due to collision between the rolling elements 7 and the separators 8 to increase the life of the bearing.

In the solid-lubrication rolling bearing 4 in this embodiment, the receiving faces 81 of the separators 8 are partial recessed spherical faces that engage with the faces of the respective rolling elements 7. Thus, position and posture of the separators 8 during operation of the bearing can be stabilized to prevent noises caused by oscillation of the separators 8.

As apparent from FIG. 17a to FIG. 17c, since the separators 8 of the present invention are thin, the separators 8 formed of the existing solid lubricant may lack strength. On the contrary, the separators 8 formed of the solid lubricant 11 having excellent impact resistance have high strength, so that damage on the separators 8 can be reliably prevented. Since the solid lubricant 11 has high sliding resistance, premature wear of the separators 8 can be prevented to keep the lubricating effect of the solid lubricant powder. Therefore, the life of the solid-lubrication rolling bearings 4 can be further extended. The solid lubricant 11 is harder than the conventional solid lubricant and thus, can be formed into a complicated shape illustrated in FIG. 17a to FIG. 17c by machining such as lathe turning after firing.

Fifth Embodiment

In the fourth embodiment, the solid-lubrication rolling bearings 4 are illustrated as full complement rolling elements without retainer. However, the restricting members 10 in the second embodiment can hold the rolling elements 7 and the separators 8 in the fourth embodiment (FIG. 17a to FIG. 17c).

Figure 19:
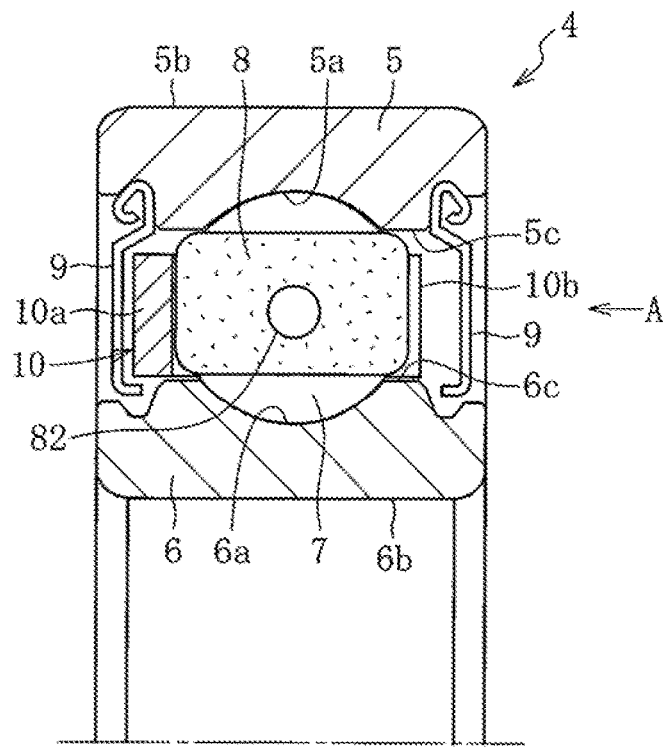
FIG. 19 is an axial sectional view illustrating a solid-lubrication rolling bearing (fifth embodiment).
Figure 20:
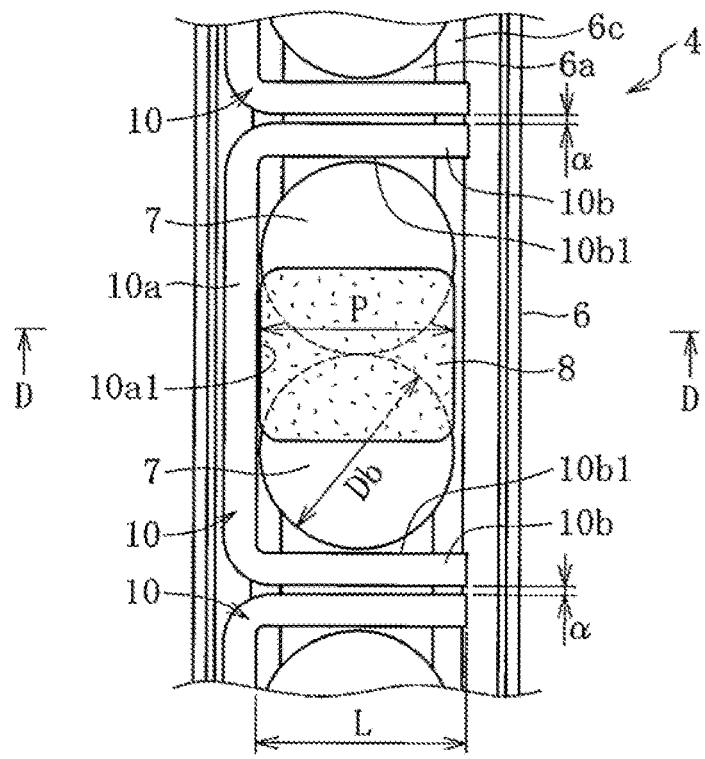
FIG. 20 is a partial exploded view illustrating the solid-lubrication rolling bearing in FIG. 19 when viewed from the outer diameter side, with an outer ring being removed.
Figure 23:
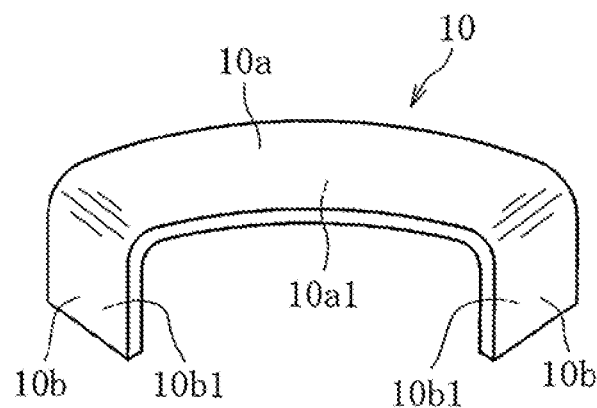
FIG. 23 is a perspective view illustrating a separator used in the solid-lubrication rolling bearing in FIG. 22.

FIG. 19, FIG. 20, and FIG. 23 illustrate a fifth embodiment. FIG. 20 is a partial exploded view illustrating the solid-lubrication bearing 4 when viewed from the outer diameter side, with an outer ring 5 and a sealing member 9 being removed, and FIG. 19 is a sectional view taken along D-D in FIG. 20. FIG. 23 is a perspective view illustrating a restricting member 10.

In the solid-lubrication rolling bearing 4 in the fifth embodiment, as described above, the separators in the fourth embodiment (FIG. 17a to FIG. 17c) are used as the separators 8. The separators 8 are formed of the above-mentioned solid lubricant 11 (FIG. 1). Since the adjacent rolling elements 7 can contact each other via the separator 8, and a pitch of the adjacent rolling elements 7 is smaller than the pitch in the second embodiment, as illustrated in FIG. 23, a circumferential length of the bottom portion 10a of the restricting member 10 is smaller than the circumferential direction of the bottom portion 10a of the restricting members 10 in the second embodiment (FIG. 10). Other configuration in the fifth embodiment is the same as that in the second embodiment and thus, the same members and elements in the fifth embodiment as those in the second embodiment are given the same reference numerals and redundant description is omitted.

Sixth Embodiment

Figure 21:
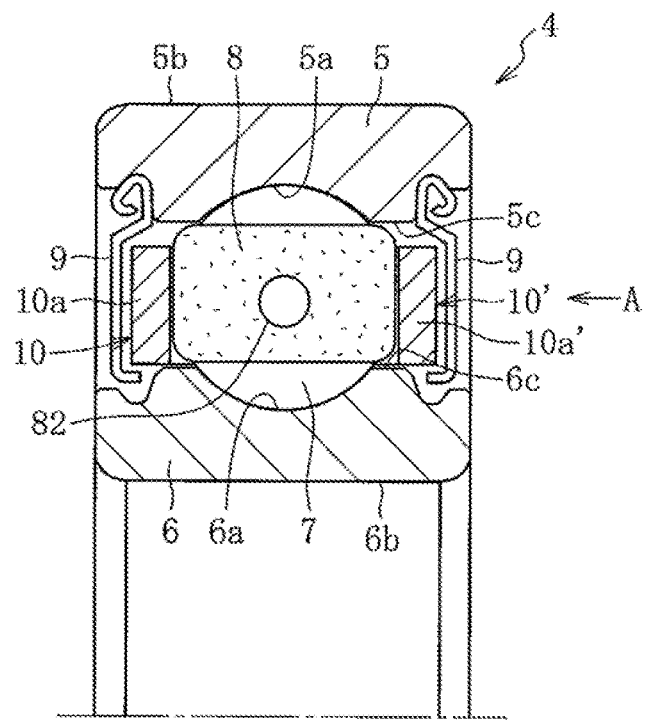
FIG. 21 is an axial sectional view illustrating a solid-lubrication rolling bearing (sixth embodiment).
Figure 22:
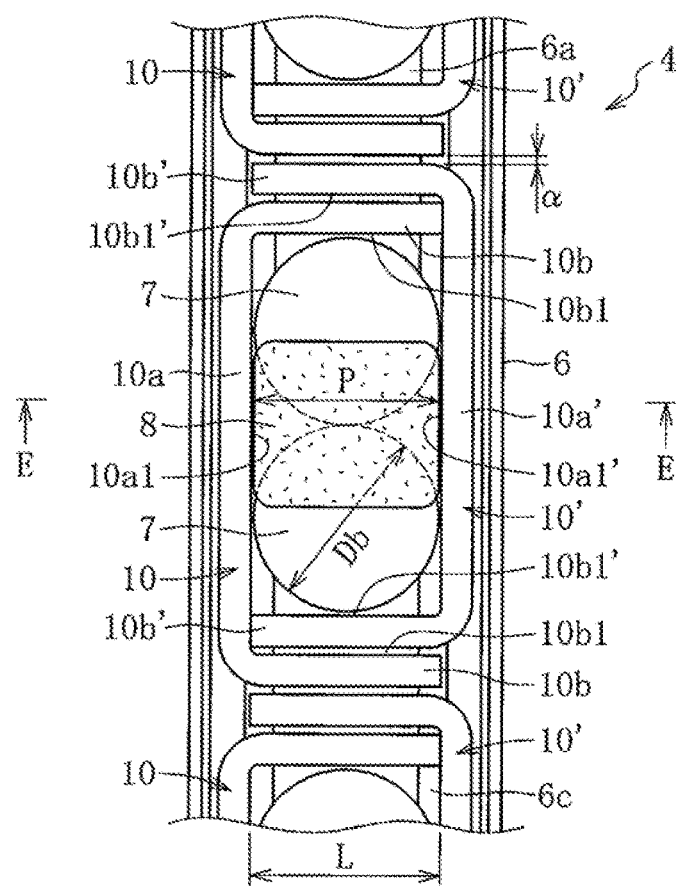
FIG. 22 is a partial exploded view illustrating the solid-lubrication rolling bearing in FIG. 21 when viewed from the outer diameter side, with an outer ring being removed.

A sixth embodiment will be described with reference to FIG. 21 to FIG. 23. FIG. 22 is a partial exploded view illustrating a solid lubrication bearing 4 when viewed from the outer diameter side, with an outer ring 5 and a sealing member 9 being removed, and FIG. 21 is a sectional view taken along E-E in FIG. 22.

In the sixth embodiment, the separators 8 in the fourth embodiment (FIG. 17a to FIG. 17c), are used, and as in the third embodiment, a pair of restricting members 10, 10' of the same shape are disposed on both axial sides of the rolling elements 7 and the separators 8. The separators 8 are made of the solid lubricant 11 (FIG. 1). Other configuration in the sixth embodiment is the same as that in the third embodiment and thus, the same members and elements in the sixth embodiment as those in the third embodiment are given the same reference numerals and redundant description is omitted.

In the description of the embodiments, the solid lubricant 11 is applied to the rolling bearing that is the deep groove ball bearing. However, the solid lubricant 11 can be applied to other types of bearings including angular contact ball bearings, cylindrical roller bearings, and tapered roller bearing. The present invention, can be applied to the outer-ring rotating rolling bearings as well as inner-ring rotating rolling bearings.

The solid lubricant according to the present invention is described to be used for the tenter clip bearing of the film stretching machine; however, it is not limited thereto. The solid lubricant can be applied to various bearings used at elevated temperatures or in a vacuum, which prevents use of grease or lubricating oil as the lubricant. As a matter of course, the solid lubricant 11 also can be applied to any equipment and mechanical parts used in similar atmospheres, other than bearings.

REFERENCE SIGNS LIST

1: Guide rail
2: Frame
3: Clip
4: Solid-lubrication rolling bearing
5: Outer ring
5a: Outer raceway face
6: Inner ring
6a: Inner raceway face
7: Rolling element (ball)
8: Separator
9: Sealing member (shield plate)
10: Lubrication ring
11: Solid lubricant
12: Carbon material particle
12': Carbon material powder
13: Graphite particle
13': Graphite powder
14: Binder component
14': Binder
15: Pores

The invention claimed is:

1. A solid lubricant formed by molding and firing powder that includes amorphous and self-sintering carbon material powder, crystalline graphite powder, and a binder,
the solid lubricant comprises:
amorphous carbon material particles formed by firing of the carbon material powder and sintered with each other, and crystalline graphite particles as main components, and further, an amorphous carbon binder component formed by firing of the binder, wherein
content of the carbon material particles is highest in weight ratio, and
the graphite particles are held by a sintered body formed by sintering the carbon material particles.

2. The solid lubricant according to claim 1, wherein the carbon material powder is present in the powder in an amount larger than an amount of the crystalline graphite powder.

3. The solid lubricant according to claim 1, wherein the powder contains 50 to 60 wt % of the carbon material powder and 25 to 40 wt % of the crystalline graphite powder.

4. The solid lubricant according to claim 1, wherein the carbon material powder and the crystalline graphite powder are granulated using the binder, and the product thereof is used as the powder.

5. The solid lubricant according to claim 1, wherein the solid lubricant further comprises at least one selected from the group consisting of W, Mo, and MoS2.

6. The solid lubricant according to claim 1, wherein the solid lubricant further comprises at least one of carbon fiber or carbon nanotube.

7. The solid lubricant according to claim 1, wherein bending strength is set to 40 to 100 MPa, and Shore hardness (HSC) is set to 50 to 100.

8. The solid lubricant according to claim 1, wherein specific wear rate is set to 1.0 to $2.5 \times 10{-7}$ mm$^3$/(N·m).

9. The solid lubricant according to claim 1, wherein density is set to 1.0 to 3.0 g/cm$^3$.

10. A solid-lubrication rolling bearing comprising:
an outer ring having an outer raceway face;
an inner ring having an inner raceway face,
a plurality of rolling elements disposed between the outer raceway face and the inner raceway face; and
a separator disposed between the adjacent rolling elements, the separator being formed of the solid lubricant according to claim 1, wherein
relative movement of the adjacent rolling elements and the separator in a direction of separating apart in a circumferential direction is restricted by restricting members, and the restricting members are disposed at a plurality of places in the circumferential direction to allow relative movement between the adjacent restricting members.

11. The solid-lubrication rolling bearing according to claim 10, wherein a pair of the restricting members are disposed on both axial sides of the rolling element and the separator, and the pair of restricting members, and the rolling element and the separator that are accommodated within the restricting members are regarded as one unit, and the units are disposed at a plurality of places in the circumferential direction to allow relative movement between the units.

12. A solid-lubrication rolling bearing comprising:

an outer ring having an outer raceway face;

an inner ring having an inner raceway face;

a plurality of rolling elements disposed between the outer raceway face and the inner raceway face; and a separator disposed between the adjacent rolling elements to allow contact between the adjacent rolling elements, the separator being formed of the solid lubricant according to claim 1.

13. The solid-lubrication rolling bearing according to claim 12, wherein the separator has receiving faces that are disposed on both circumferential sides, and contact the respective rolling elements, and an opening opened to the both receiving faces, and the adjacent rolling elements are brought into contact with each other via the opening.

14. The solid-lubrication rolling bearing according to claim 13, wherein the receiving faces of the separator each are shaped to make surface-contact with the rolling elements.

15. The solid-lubrication rolling bearing according to claim 10, used in a tenter clip of a film stretching machine.

16. The solid lubricant according to claim 1, wherein the binder component is combined with the carbon material particles.

* * * * *